United States Patent
Shan et al.

(10) Patent No.: US 11,954,835 B2
(45) Date of Patent: Apr. 9, 2024

(54) METHODS, DEVICES, APPARATUSES, AND MEDIA FOR IMAGE FUSION UTILIZING IMAGES AND LIDAR POINT CLOUDS

(71) Applicant: Tanway Technology (Beijing) Co., Ltd., Beijing (CN)

(72) Inventors: Jiawei Shan, Beijing (CN); Ruitong Zheng, Beijing (CN); Shiwei Wang, Beijing (CN); Luofeng Shen, Beijing (CN); Hongpeng Li, Beijing (CN)

(73) Assignee: Tanway Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/255,164

(22) PCT Filed: Apr. 21, 2022

(86) PCT No.: PCT/CN2022/088255
§ 371 (c)(1),
(2) Date: May 31, 2023

(87) PCT Pub. No.: WO2023/197351
PCT Pub. Date: Oct. 19, 2023

(65) Prior Publication Data
US 2024/0037707 A1 Feb. 1, 2024

(30) Foreign Application Priority Data
Apr. 11, 2022 (CN) .......................... 202210375538.5

(51) Int. Cl.
*G06T 5/50* (2006.01)
*G01S 17/89* (2020.01)
(Continued)

(52) U.S. Cl.
CPC ................ *G06T 5/50* (2013.01); *G01S 17/89* (2013.01); *G06T 7/90* (2017.01); *G06T 17/00* (2013.01);
(Continued)

(58) Field of Classification Search
CPC .. G06T 5/50; G06T 17/00; G06T 7/90; G06T 2207/10024; G06T 2207/20221
(Continued)

(56) References Cited

U.S. PATENT DOCUMENTS 10,628,671 B2 * 4/2020 Zang .................... G03B 15/006
11,341,615 B2 * 5/2022 Toyoura ................. G06T 5/002
(Continued)

FOREIGN PATENT DOCUMENTS

CN 107610084 A 1/2018
CN 108701374 A 10/2018
(Continued)

OTHER PUBLICATIONS

International Searching Authority (ISA/CN), International Search Report for PCT/CN2022/088255, dated Dec. 15, 2022, 5 pages (English translation only).
(Continued)

*Primary Examiner* — Thomas J Lett
(74) *Attorney, Agent, or Firm* — Jaffery Watson Mendonsa & Hamilton LLP (57) ABSTRACT

An image fusion method based on image and LiDAR point cloud is provided. The method comprises: acquiring a first image and sparse point cloud data, point cloud data in each channel of the sparse point cloud data corresponding to pixels in the first image respectively, and the sparse point cloud data and the first image having space and time synchronicity; obtaining a target gradient value corresponding to at least one target pixel in the first image according to
(Continued)

the first image, the target pixel being a non-edge pixel of the first image; up-sampling the sparse point cloud data based on at least one target gradient value to obtain dense point cloud data, the target gradient value being determined according to a corresponding target pixel between adjacent channels of the sparse point cloud data; and obtaining a target fusion image based on the first image and the dense point cloud data.

19 Claims, 5 Drawing Sheets

(51) Int. Cl.
    *G06T 7/90*     (2017.01)
    *G06T 17/00*     (2006.01)
    *G06V 10/56*     (2022.01)

(52) U.S. Cl.
    CPC .... *G06V 10/56* (2022.01); *G06T 2207/10024* (2013.01); *G06T 2207/20221* (2013.01)

(58) Field of Classification Search
    USPC .......................................................... 345/629
    See application file for complete search history.

(56) References Cited

U.S. PATENT DOCUMENTS

| | | | |
|---|---|---|---|
| 2018/0101932 A1 | 4/2018 | Kwon et al. | |
| 2019/0370989 A1 | 12/2019 | Zhao et al. | |
| 2020/0333444 A1 | 10/2020 | Fu et al. | |
| 2021/0232871 A1* | 7/2021 | Iancu | G06T 7/50 |

FOREIGN PATENT DOCUMENTS

| | | |
|---|---|---|
| CN | 109300190 A | 2/2019 |
| CN | 111161338 A | 5/2020 |
| CN | 111563923 A | 8/2020 |
| CN | 111724478 A | 9/2020 |
| CN | 112085842 A | 12/2020 |
| CN | 112102472 A | 12/2020 |
| CN | 112150595 A | 12/2020 |
| CN | 112731436 A | 4/2021 |
| CN | 112766328 A | 5/2021 |
| CN | 113160327 A | 7/2021 |
| CN | 113160390 A | 7/2021 |
| CN | 114140758 A | 3/2022 |
| WO | 2017023210 A1 | 2/2017 |
| WO | 2022045495 A1 | 3/2022 |

OTHER PUBLICATIONS

International Searching Authority (ISA/CN), Written Opinion for PCT/CN2022/088255, dated Dec. 15, 2022, 5 pages (English translation only).
Nian Tang, "Research on the Registration Technology of Image Matching Point Cloud," China Excellent Master's Thesis Full-text Database-Basic Science Series, Jan. 15, 2022, pp. A005-279.
Yanjun Peng, et al., Sparse-to-Dense Multi-Encoder Completion of Unstructured Point Cloud, Feb. 10, 2020, pp. 30969-30978.
International Searching Authority (ISA/CN), International Search Report for PCT/CN2022/088255, dated Dec. 15, 2022, 5 pages.
International Searching Authority (ISA/CN), Written Opinion for PCT/CN2022/088255, dated Dec. 15, 2022, 5 pages.
The State Intellectual Proprty Office of People's Republic of China, First Office Action for Chinese Patent Application No. 202210375538. 5, dated Aug. 25, 2022, 15 pages (with translation).
The State Intellectual Proprty Office of People's Republic of China, Notification to Grant Patent Right for Invention for Chinese Patent Application No. 202210375538.5, dated Nov. 3, 2022, 6 pages (with translation).

* cited by examiner

METHODS, DEVICES, APPARATUSES, AND MEDIA FOR IMAGE FUSION UTILIZING IMAGES AND LIDAR POINT CLOUDS

CROSS-REFERENCE TO RELATED APPLICATIONS

This application is a national phase application of International Application No. PCT/CN2022/088255, filed on Apr. 21, 2022, which claims the priority to Chinese Patent Application No. 202210375538.5, entitled "METHODS, DEVICES, APPARATUSES, AND MEDIA FOR IMAGE FUSION UTILIZING IMAGES AND LIDAR POINT CLOUDS," filed on Apr. 11, 2022, at China National Intellectual Property Administration, the entire contents of which are incorporated herein by reference.

TECHNICAL FIELD

The present disclosure relates to the field of image fusion technologies, and more particularly, to methods, apparatuses, devices, and media for image fusion based on image and LiDAR point cloud.

BACKGROUND

In recent years, in the field of applications such as unmanned driving, Simultaneous Localization and Mapping (SLAM), and the like, image data is mainly acquired by different sensors to sense the world outside. At present, a single sensor is primarily adopted to obtain image data, wherein a camera is taken as a mainstream sensor, which can acquire a two-dimensional image with high resolution ratio, but cannot provide three-dimensional information of a shot target. Laser radar can acquire three-dimensional point cloud information of the shot target and is less influenced by external disturbance, but the point cloud information acquired through the laser radar has less amount of information and lower resolution ratios compared to the two-dimensional image, and has a problem of blurred edges.

Based on this, in the prior art, edge detection is performed by using a depth learning method. A target depth edge is acquired by combining an initial depth edge of an initialized depth map, and interpolation filling is performed on the target depth edge and the initial depth edge, so that the problem of blurred edges is solved, and the resolution of the depth image is improved. However, employing the prior art has the problem of large calculation amount and low efficiency since the edge information is extracted by using the deep learning method.

SUMMARY

(I) Technical Problems to be Solved

Employing deep learning to extract edge information has the problems of large calculation amount and low efficiency.

(II) Technical Solutions

According to various embodiments of the present disclosure, an image fusion method and apparatus based on image and LiDAR point cloud, a device and a medium are provided.

The embodiments of the present disclosure provide an image fusion method based on images and LiDAR point cloud. The method includes:

acquiring a first image and sparse point cloud data, point cloud data comprised in each channel of the sparse point cloud data corresponding to pixels in the first image respectively, and the sparse point cloud data and the first image having space and time synchronicity;

obtaining a target gradient value corresponding to at least one target pixel comprised in the first image according to the first image, the target pixel being a non-edge pixel of the first image;

up-sampling the sparse point cloud data based on at least one target gradient value to obtain dense point cloud data, the target gradient value being determined according to a corresponding target pixel between adjacent channels of the sparse point cloud data; and obtaining a target fusion image based on the first image and the dense point cloud data.

As an optional embodiment of the embodiments of the present disclosure, the obtaining the target gradient value corresponding to the at least one target pixel comprised in the first image according to the first image, includes:

performing gradient calculation on each pixel comprised in the first image to obtain a gradient value corresponding to each pixel; and determining the target gradient value corresponding to the target pixel according to the gradient value corresponding to each pixel.

As an optional embodiment of the embodiments of the present disclosure, the determining the target gradient value corresponding to the target pixel according to the gradient value corresponding to each pixel, includes:

determining whether the gradient value corresponding to each pixel is less than or equal to a preset gradient value; and when it is determined that the gradient value corresponding to the pixel is less than or equal to the preset gradient value, determining the target gradient value corresponding to the target pixel according to the current gradient value corresponding to the pixel.

As an optional embodiment of the embodiments of the present disclosure, the up-sampling the sparse point cloud data based on at least one target gradient value to obtain the dense point cloud data, includes:

sequentially traversing to acquire first depth information corresponding to a previous channel and second depth information corresponding to a latter channel comprised in the sparse point cloud data until the latter channel is the last channel of the sparse point cloud data;

obtaining third depth information corresponding to a target channel based on at least one target gradient value, the first depth information, and the second depth information, the target channel being determined according to a target pixel between the previous channel and the latter channel; and obtaining the dense point cloud data based on at least one first depth information, at least one second depth information and at least one third depth information.

As an optional embodiment of the embodiments of the present disclosure, the obtaining the third depth information corresponding to the target channel based on at least one target gradient value, the first depth information, and the second depth information, includes:

acquiring a target gradient value of at least one target pixel between the previous channel and the target channel and a target gradient value of at least one target pixel between the latter channel and the target channel;

calculating an average value of the target gradient value of at least one target pixel between the previous channel and the target channel to obtain a first target gradient average value;

calculating an average value of the target gradient value of at least one target pixel between the latter channel and the target channel to obtain a second target gradient average value; and determining the third depth information corresponding to the target channel according to the first target gradient average value, the second target gradient average value, the first depth information, and the second depth information.

As an optional embodiment of the embodiments of the present disclosure, the determining the third depth information corresponding to the target channel according to the first target gradient average value, the second target gradient average value, the first depth information, and the second depth information, includes:

weighting and summing the first target gradient average, the second target gradient average, the first depth information, and the second depth information to determine the third depth information corresponding to the target channel.

As an optional embodiment of the embodiments of the present disclosure, the target channel is determined according to the target pixel between the previous channel and the latter channel, including:

counting the number of target pixels between the previous channel and the latter channel; and determining the target pixel corresponding to the target channel based on the number of the target pixels.

The embodiments of the present disclosure provide an image fusion apparatus based on image and LiDAR point cloud, including:

an acquisition module, configured to acquire a first image and sparse point cloud data, point cloud data comprised in each channel of the sparse point cloud data corresponding to pixels comprised in the first image respectively, and the sparse point cloud data and the first image having space and time synchronicity;

a target gradient value obtaining module, configured to obtain a target gradient value corresponding to at least one target pixel comprised in the first image according to the first image, the target pixel being a non-edge pixel of the first image;

a dense point cloud data obtaining module, configured to up-sample the sparse point cloud data based on at least one target gradient value to obtain dense point cloud data, the target gradient value being determined according to a corresponding target pixel between adjacent channels of the sparse point cloud data; and a target fusion image obtaining module, configured to obtain a target fusion image based on the first image and the dense point cloud data.

The embodiments of the present disclosure provide an electronic device, including a memory and a processor, the memory storing a computer program, wherein the processor, when executing the computer program, implements the steps of the image fusion method based on image and LiDAR point cloud according to the first aspect.

The embodiments of the present disclosure further provide a computer-readable storage medium storing a computer program thereon, wherein the computer program, when executed by a processor, executes the steps of the image fusion method based on image and LiDAR point cloud according to the first aspect.

Other features and advantages of the present disclosure will be elaborated in the following specification, and will be partially obvious from the specification, or may be learned by practice of the present disclosure. The objects and other advantages of the present disclosure may be realized and attained by the structure particularly pointed out in the specification, claims, and the appended drawings. The details of one or more embodiments of the present disclosure are set forth in the following drawings and description.

To make the above objects, features and advantages of the present disclosure more obvious and easier to understand, the optional embodiments will be described in detail below in conjunction with the accompanying drawings.

BRIEF DESCRIPTION OF THE DRAWINGS

In order to illustrate the technical solutions in the embodiments of the present disclosure or the prior art more clearly, the drawings to be used in the description of the embodiments or the prior art will be briefly described below. Obviously, those of ordinary skills in the art can also obtain other drawings based on these drawings without going through any creative work.

DETAILED DESCRIPTION OF THE EMBODIMENTS

In order to better understand the above objects, features and advantages of the present disclosure, the solutions to the present disclosure will be further described below. It should be noted that, in case of no conflict, the embodiments in the present disclosure and the features in the embodiments may be mutually combined with each other.

In the following description, many specific details are set forth in order to fully understand the present disclosure, but the present disclosure may also be implemented in other ways different from those described herein. Obviously, the embodiments described in the specification are merely a part of, rather than all of, the embodiments of the present disclosure.

The terms "first", "second" and the like in the specification and claims of the present disclosure are used to distinguish different objects, and are not used to describe a specific sequence of the objects.

In the embodiment of the present disclosure, the words "exemplary" or "for example" are expressed as examples, illustrations or explanations. Any embodiment or design described as "exemplary" or "for example" in the embodiments of the present disclosure should not be interpreted as being more preferred or advantageous than other embodiments or designs. Exactly, the use of the words such as "exemplary" or "for example" is intended to present related concepts in a specific way. In addition, in the description of the embodiments of the present disclosure, unless otherwise specified, "a plurality of" means two or more.

In recent years, in the field of applications such as unmanned driving, Simultaneous Localization and Mapping (SLAM) and the like, image data is mainly acquired by different sensors to sense the world outside. At present, a single sensor is mostly adopted to obtain image data, wherein a camera is taken as a mainstream sensor, which can acquire a two-dimensional image with high resolution ratio but cannot provide three-dimensional information of a shot target. Laser radar can acquire three-dimensional point cloud information of the shot target and is less influenced by external disturbance, but the point cloud information acquired through the laser radar may have less information and a lower resolution ratio compared to the two-dimensional image and may have blurred edges.

Based on this, in the prior art, edge detection is performed by using a depth learning method, a target depth edge is acquired by combining an initial depth edge of an initialized depth map, and interpolation filling is performed on the target depth edge and the initial depth edge, so that the problem of blurred edges is solved, and the resolution of the depth image is improved. However, employing the prior art has the problem of large calculation amount and low efficiency since the edge information is extracted by using the deep learning method.

Therefore, the present disclosure provides an image fusion method based on image and LiDAR point cloud, including: acquiring a first image and sparse point cloud data, point cloud data comprised in each channel of the sparse point cloud data corresponding to pixels comprised in the first image respectively, and the sparse point cloud data and the first image having space and time synchronicity; obtaining a target gradient value corresponding to at least one target pixel comprised in the first image according to the first image, the target pixel being a non-edge pixel of the first image; up-sampling the sparse point cloud data based on at least one target gradient value to obtain dense point cloud data, wherein the target gradient value is determined according to a corresponding target pixel between adjacent channels of the sparse point cloud data; and obtaining a target fusion image based on the first image and the dense point cloud data. In this way, by acquiring the first image and the sparse point cloud data having time and space synchronicity, and utilizing the target gradient values of a plurality of non-edge pixels which are between the adjacent channels of the sparse point cloud data and corresponding to the first image, the sparse point cloud data are guided to be up-sampled, so as to obtain the dense point cloud data and map the dense point cloud data onto the first image to acquire the target fusion image, so that the condition that edge information is extracted by utilizing deep learning in the prior art is avoided, up-sampling of the sparse point cloud data is, a calculated amount is reduced, and a resolution of the point cloud data is improved.

Figure 1:
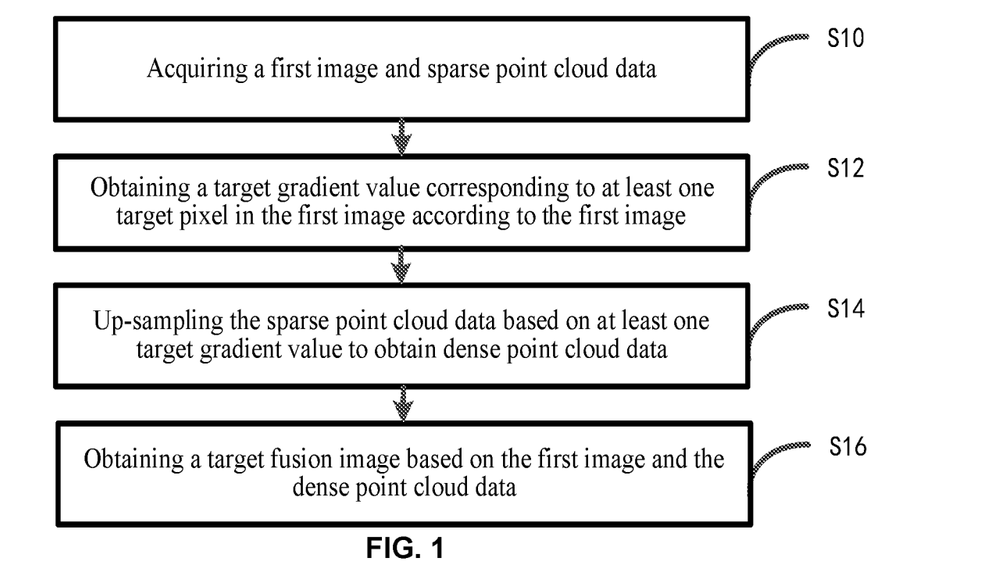
FIG. 1 is a schematic flow chart of an image fusion method based on image and LiDAR point cloud in accordance with the embodiments of the present disclosure.

In one embodiment, as shown in FIG. 1, FIG. 1 is a schematic flow chart of an image fusion method based on image and LiDAR point cloud in accordance with the embodiments of the present disclosure, wherein the method specifically includes the following steps.

At S10, a first image and sparse point cloud data are acquired.

Point cloud data comprised in each channel of the sparse point cloud data corresponds to pixels comprised in the first image respectively; and the sparse point cloud data and the first image have space and time synchronicity.

The above-mentioned point cloud data refers to a set of vectors with three-dimensional spatial coordinates obtained by laser radar, so it is called point cloud due to large number and density. The point cloud data includes but is not limited to geometric position information, color information and intensity information. Because the point cloud data has spatial coordinates, it is widely used in multiple fields such as surveying and mapping, electric power, architecture, industry, automobiles, games, criminal investigation, or the like, but is not limited to this, is not specifically limited in the present disclosure and those skilled in the art may set the point cloud data according to the actual situations. The above channels are used to store the geometric position information, the color information and the intensity information included in the point cloud data. The sparse point cloud data refers to the point cloud data corresponding to each pixel in a two-dimensional image that cannot be completely acquired when using the laser radar to acquire the set of vectors with three-dimensional spatial coordinates.

It should be noted that the first image and the sparse point cloud data above are acquired based on an image detection module and a photoelectric detection module included in the same radar detection system, and time alignment of the first image and sparse point cloud data acquisition level is realized mainly by triggering a laser emission module and the image detection module at the same time, thus ensuring that the laser and the image detect the same object at the same time, and further realizing the time synchronization and space synchronization of the point cloud data and the image data.

Specifically, the laser emission module and the image detection module are triggered at the same time, the first image is acquired by the image detection module, and the sparse point cloud data is acquired by the laser emission module.

At S12, a target gradient value corresponding to at least one target pixel comprised in the first image is obtained according to the first image.

The target pixel is a non-edge pixel of the first image. The gradient value is a change rate to each pixel in the first image in X and Y directions, which may include two components: the change of the X axis and the change of the Y axis. The gradient value may be understood as the change compared with the adjacent pixels, which is equivalent to representing an edge in the first image through a difference between two adjacent pixels, that is, when there is an edge in the first image, the corresponding pixel at the edge has a larger gradient value. Therefore, by obtaining the gradient value of each pixel in the first image, edge contour detection is carried out, and the target gradient value corresponding to the non-edge pixel is further determined.

Figure 2:
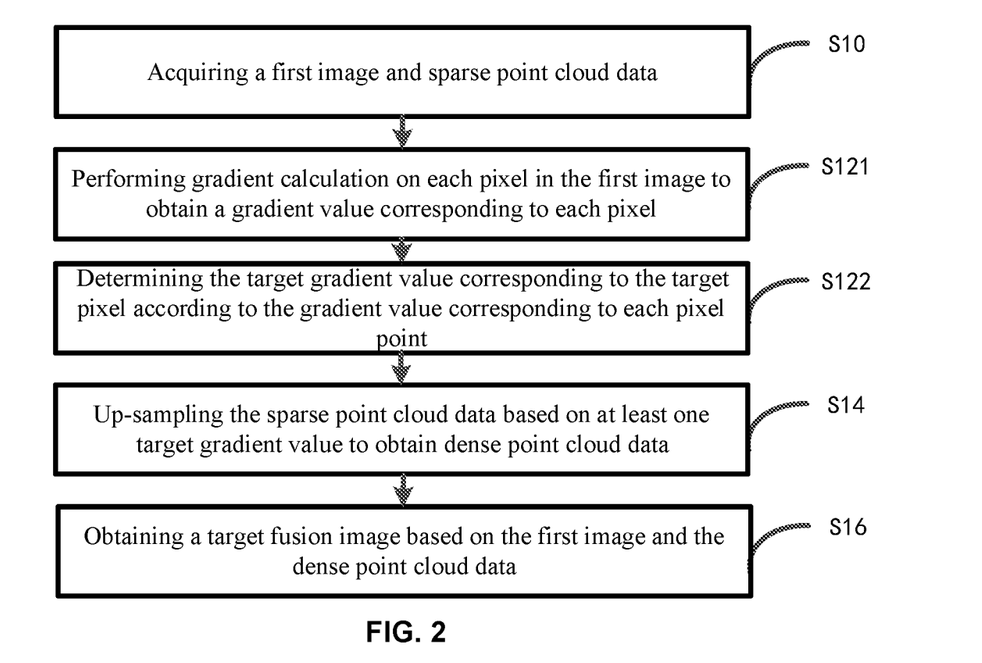
FIG. 2 is a schematic flow chart of another image fusion method based on image and LiDAR point cloud in accordance with the embodiments of the present disclosure.

On the basis of the above embodiments, in some embodiments of the present disclosure, as shown in FIG. 2, one possible way to obtain the target gradient value corresponding to at least one target pixel comprised in the first image according to the first image is as follows.

At S121, gradient calculation is performed on each pixel comprised in the first image to obtain a gradient value corresponding to each pixel.

Specifically, the gradient value corresponding to each pixel is obtained by performing gradient calculation on each pixel comprised in the first image.

For example, the gradient value of each pixel may be calculated by setting a gradient operator in a pixel neighborhood in the first image, such as Sobel operator and Laplace Operator, and performing convolution calculation on each pixel by using a regional convolution kernel, so as to obtain the gradient value of each pixel, but is not limited to this, is not specifically limited in the present disclosure and those skilled in the art may set according to the actual situations.

At S122, the target gradient value corresponding to the target pixel is determined according to the gradient value corresponding to each pixel.

Specifically, the gradient value corresponding to each pixel is obtained by performing gradient calculation on each pixel in the first image, and further, the target gradient value corresponding to one or more non-edge pixels is determined according to the gradient value corresponding to each pixel.

Figure 3:
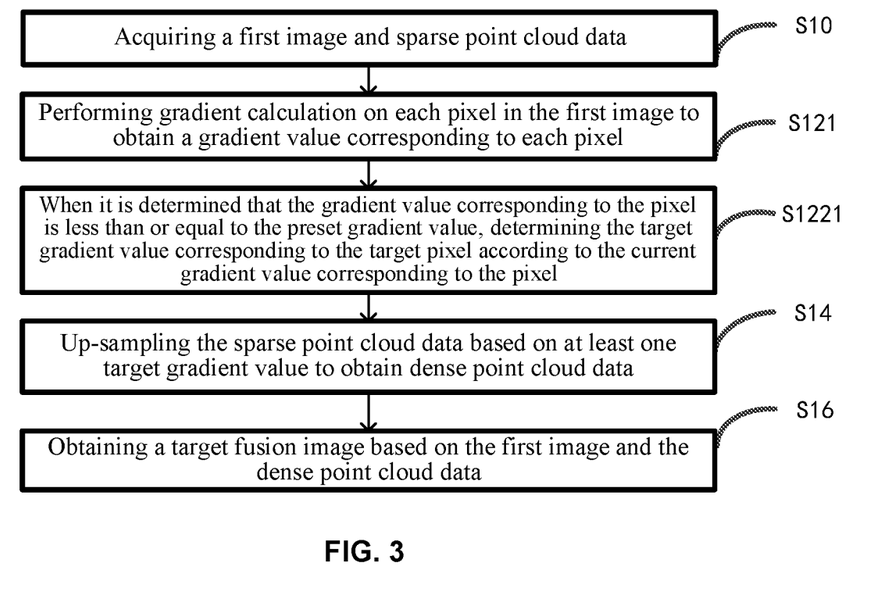
FIG. 3 is a schematic flow chart of yet another image fusion method based on image and LiDAR point cloud in accordance with the embodiments of the present disclosure.

Based on the above embodiments, in some embodiments of the present disclosure, it is judged whether the gradient value corresponding to each pixel is less than or equal to a preset gradient value. As shown in FIG. 3, one possible way to determine the target gradient value corresponding to the target pixel according to the gradient value corresponding to each pixel is as follows.

At S1221, when it is determined that the gradient value corresponding to the pixel is less than or equal to the preset gradient value, the target gradient value corresponding to the target pixel is determined according to the current gradient value corresponding to the pixel.

The preset gradient value is a parameter value set to judge whether the pixel is a non-edge pixel according to the gradient value corresponding to each pixel in the first image. The value of the preset gradient value is not specifically limited in the present disclosure, but those skilled in the art may set the preset gradient value according to the actual situations.

Specifically, the gradient value corresponding to each pixel is obtained by calculating the gradient of each pixel in the first image, and it is judged whether the gradient value corresponding to each pixel is less than or equal to the preset gradient threshold. When it is determined that the gradient value corresponding to each pixel is less than or equal to the preset gradient threshold, it is indicated that the current pixel is a non-edge pixel, so that the target gradient value corresponding to the target pixel is obtained.

In this way, through the image fusion method based on image and LiDAR point cloud provided by the present disclosure, the target gradient values corresponding to non-edge pixels are determined by calculating the gradient value of each pixel in the first image and setting an appropriate preset gradient threshold, so as to ensure that the sparse point cloud data are up-sampled by using the target gradient values corresponding to the non-edge pixels in the first image. Moreover, as the non-edge pixels belong to the same connected area in the first image, up-sampling the sparse point cloud data based on the target gradient values corresponding to the non-edge pixels can improve the accuracy of acquiring the dense point cloud data.

At S14, the sparse point cloud data may be up-sampled based on at least one target gradient value to obtain the dense point cloud data.

The target gradient value is determined according to the corresponding target pixel between the adjacent channels of the sparse point cloud data. Sampling refers to re-sampling a digital signal, and comparing a re-sampling rate with an original sampling rate of the digital signal. When the re-sampling rate is greater than that of the original signal, it is called up up-sampling, and when the re-sampling rate is less than that of the original signal, it is called up down-sampling. The up-sampling is also called up-sampling or interpolating, the essence of which is interpolating or interpolation.

Figure 4:
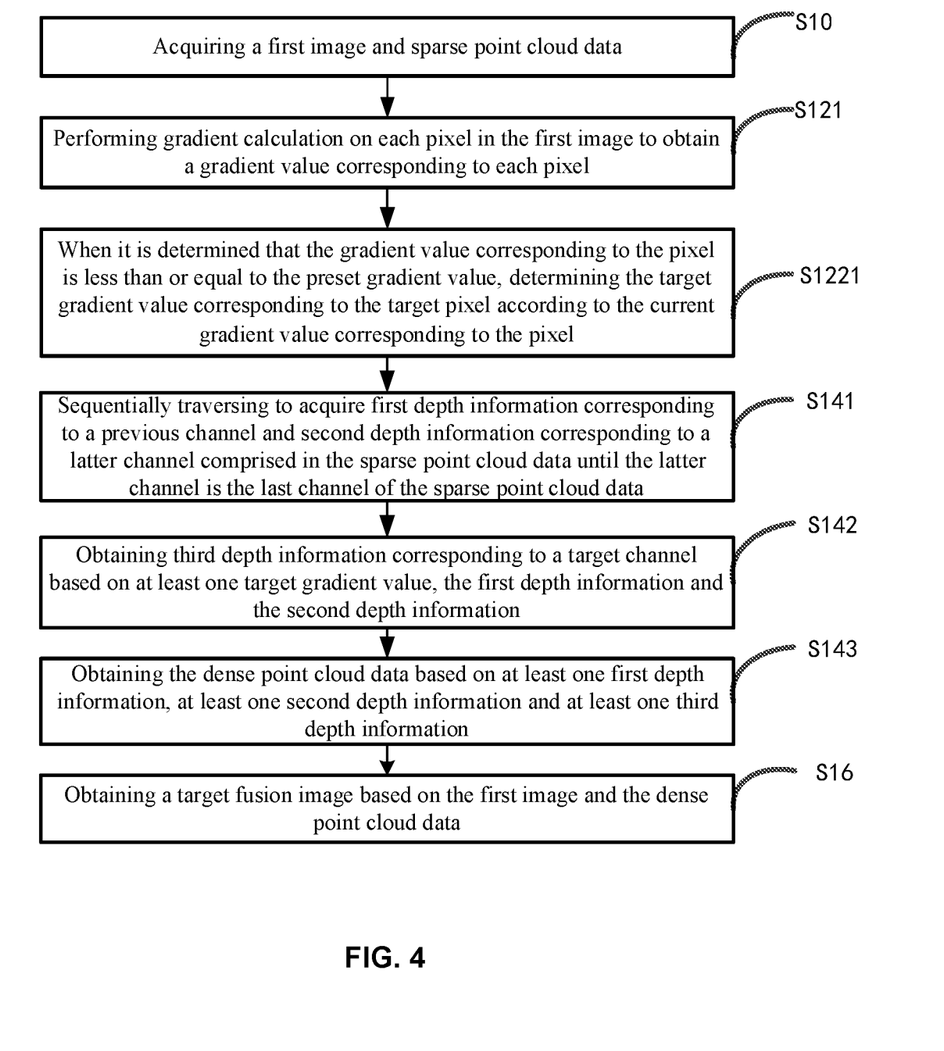
FIG. 4 is a schematic flow chart of one another image fusion method based on image and LiDAR point cloud in accordance with the embodiments of the present disclosure.

Based on the above embodiments, in some embodiments of the present disclosure, as shown in FIG. 4, one possible way to up-sample the sparse point cloud data based on at least one target gradient value is as follows.

At S141, first depth information corresponding to a previous channel and second depth information corresponding to a latter channel comprised in the sparse point cloud data are acquired by sequentially traversing until the latter channel is the last channel of the sparse point cloud data.

The depth information refers to the number of bits used to store each pixel, and is also used to measure the resolution of the image, which determines a number of colors per pixel of a color image, or determines a possible gray level of each pixel of a gray image.

Specifically, for the sparse point cloud data acquired by a photoelectric detection module, the first depth information corresponding to the previous channel and the second depth information corresponding to the latter channel comprised in the sparse point cloud data are successively acquired until the latter channel is the last channel of all channels comprised in the sparse point cloud data.

It should be noted that all channels comprised in the sparse point cloud data do not correspond to each pixel in the first image one by one, but correspond to some pixels in the first image respectively. It may be understood that there may be a plurality of target pixels between two adjacent channels.

At S142, third depth information corresponding to a target channel is obtained based on at least one target gradient value, the first depth information, and the second depth information.

The target channel is determined according to a target pixel between the previous channel and the latter channel, and the target channel is a channel obtained after up-sampling between the previous channel and the latter channel.

Optionally, based on the above embodiments, in some embodiments of the present disclosure, one way to determine the target channel may be as follows.

The number of target pixels between the previous channel and the latter channel is counted.

The target pixel corresponding to the target channel is determined based on the number of the target pixels.

For example, the above-mentioned first image is an image with a size of 254*254. For the case that the previous channel corresponds to pixels in the 10th row and 10th column in the first image, and the latter channel corresponds to pixels in the 10th row and 20th column in the first image, then the number of the target pixels in the 10th row between the previous channel and the latter channel is counted as 10, then the pixels in the 10th row and 15th column in the first image are determined as the target pixels corresponding to the target channel according to the number of the target pixels.

Figure 5:
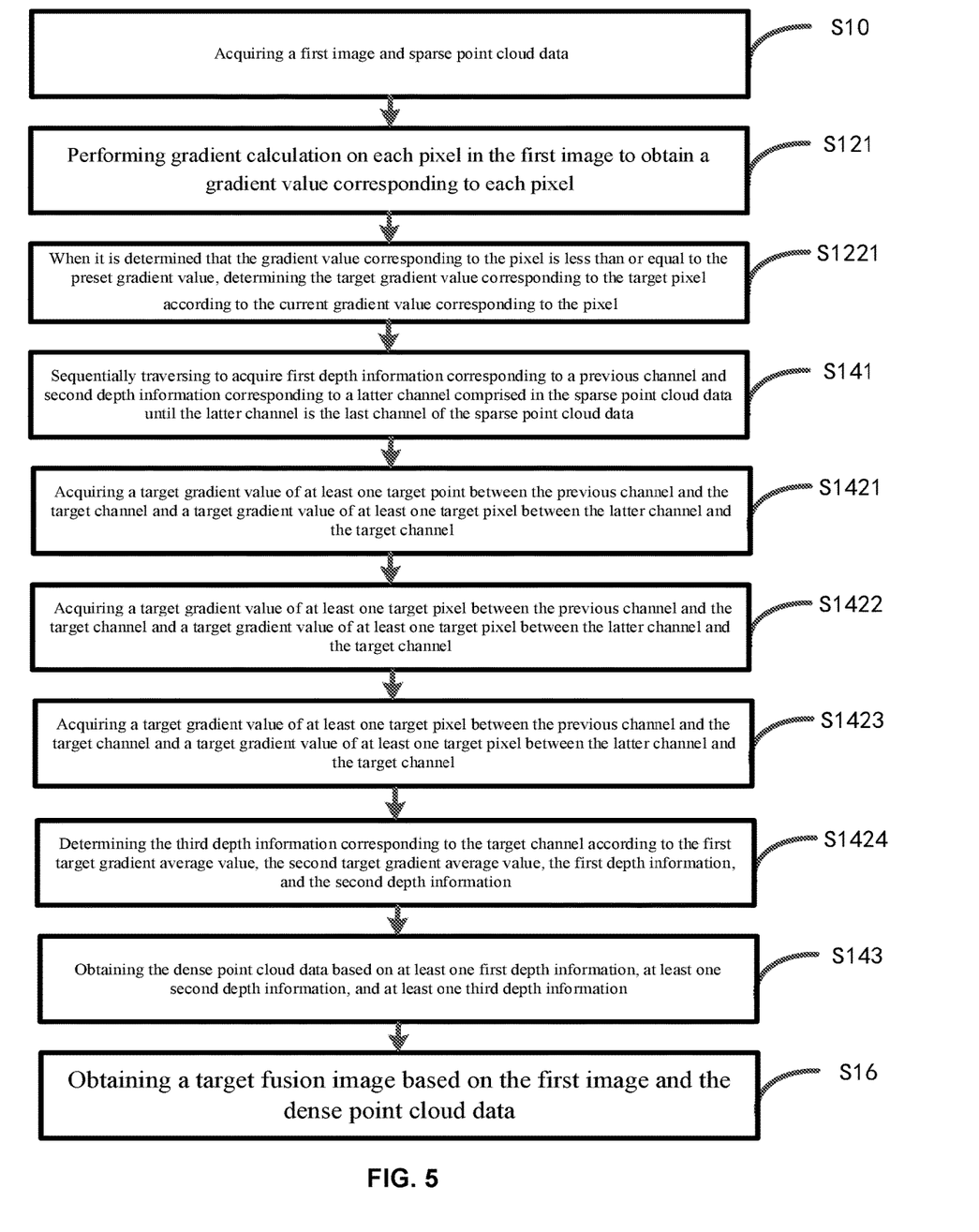
FIG. 5 is a schematic flow chart of one another image fusion method based on image and LiDAR point cloud in accordance with the embodiments of the present disclosure.

Further, based on the above embodiments, in some embodiments of the present disclosure, as shown in FIG. 5, one way to realize S142 may be as follows.

At S1421, A target gradient value of at least one target pixel between the previous channel and the target channel and a target gradient value of at least one target pixel between the latter channel and the target channel are acquired.

Specifically, after the target channel is determined, the target gradient values corresponding to one or more target pixels, i.e., non-edge pixels, between the previous channel and the target channel comprised in the sparse point cloud data are acquired, and the target gradient values corresponding to one or more target pixels, i.e., non-edge pixels, between the latter channel and the target channel comprised in the sparse point cloud data are acquired.

At S1422, an average value of the target gradient value of at least one target pixel between the previous channel and the target channel is calculated to obtain a first target gradient average value.

At S1423, an average value of the target gradient value of at least one target pixel between the latter channel and the target channel is calculated to obtain a second target gradient average value.

At S1424, the third depth information corresponding to the target channel is determined according to the first target gradient average value, the second target gradient average value, the first depth information, and the second depth information.

Specifically, after the target gradient values corresponding to one or more target pixels, i.e., non-edge pixels, between the previous channel and the target channel, and the target gradient values corresponding to one or more target pixels, i.e., non-edge pixels, between the latter channel and the target channel are acquired, the average value of the target gradient values corresponding to one or more non-edge pixels between the previous channel and the target channel are respectively calculated, so as to determine the first target gradient average value corresponding to the previous channel, and the average value of the target gradient values corresponding to one or more non-edge pixels between the latter channel and the target channel are respectively calculated, so as to determine the second target gradient average value corresponding to the latter channel. Further, the third depth information corresponding to the target channel is determined according to the first target gradient average value and the first depth information corresponding to the previous channel, and the second target gradient average value and the second depth information corresponding to the latter channel.

Optionally, on the basis of the above embodiments, in some embodiments of the present disclosure, one way to realize the S1424 may be as follows.

The first target gradient average, the second target gradient average, the first depth information, and the second depth information are weighted and summed to determine the third depth information corresponding to the target channel.

Specifically, the third depth information corresponding to the target channel is determined according to formula $D_n = \alpha D_n \text{Grad}_n + \beta D_{n+1} \text{Grad}_{n+1}$.

wherein, $D_n$ represents the first depth information corresponding to the previous channel, $\text{Grad}_n$ represents the first target gradient average value corresponding to a plurality of target pixels between the previous channel and the target channel, $\alpha$ represents a weight corresponding to the previous channel, $D_{n+1}$ represents the second depth information corresponding to the latter channel, $\text{Grad}_{n+1}$ represents the second target gradient average value corresponding to a plurality of target pixels between the latter channel and the target channel, and $\beta$ represents a weight corresponding to the previous channel. The values of $\alpha$ and $\beta$ are not specific in the present disclosure, and may be set by those skilled in the art according to the actual situations.

At S143, the dense point cloud data is obtained based on at least one first depth information, at least one second depth information and at least one third depth information.

Specifically, according to all channels comprised in the sparse point cloud data, a plurality of first depth information, a plurality of second depth information and a plurality of third depth information are sequentially obtained, and then the dense point cloud data is determined based on the plurality of first depth information, the plurality of second depth information and the plurality of third depth information.

In this way, according to the image fusion method based on image and LiDAR point cloud provided by the embodiment, the sparse point cloud data is up-sampled by acquiring the target gradient values corresponding to the non-edge pixels between adjacent channels of the sparse point cloud data, that is, interpolation is performed between the adjacent channels of the sparse point cloud data, so as to obtain the dense and regular point cloud data, which is equivalent to using the gradient values corresponding to the non-edge pixels of the first image to guide the up-sampling of the sparse point cloud data, thereby improving the resolution of the dense point cloud data.

At S16, the target fusion image is obtained based on the first image and the dense point cloud data.

Specifically, the obtained dense point cloud data is mapped into the first image to thus obtain the target fusion image.

In this way, the image fusion method based on image and LiDAR point cloud provided by the embodiment acquires the first image and the sparse point cloud data, the point cloud data comprised in each channel of the sparse point cloud data corresponding to the pixels comprised in the first image respectively, and the sparse point cloud data and the first image having space and time synchronicity; obtains the target gradient value corresponding to at least one target pixel comprised in the first image according to the first image, the target pixel being the non-edge pixel of the first image; up-samples the sparse point cloud data based on at least one target gradient value to obtain the dense point cloud data, the target gradient value being determined according to the corresponding target pixel between the adjacent channels of the sparse point cloud data; and obtains the target fusion image based on the first image and the dense point cloud data. In this way, by acquiring the first image and the sparse point cloud data having time and space synchronicity, and utilizing the target gradient values of a plurality of non-edge pixels which are between the adjacent channels of the sparse point cloud data and corresponding to the first image, the sparse point cloud data are guided to be up-sampled, so as to obtain the dense point cloud data and map the dense point cloud data onto the first image to acquire the target fusion image, so that the condition that edge information is extracted by utilizing deep learning in the prior art is avoided, up-sampling of the sparse point cloud data is, a calculated amount is reduced, and a resolution of the point cloud data is improved.

It should be understood that although the steps in the flow charts of FIG. 1 to FIG. 5 are shown in sequence as indicated by arrows, these steps are not necessarily executed in sequence as indicated by the arrows. Unless explicitly stated herein, there is no strict sequence restriction on the execution of these steps, and these steps may be executed in other sequences. Moreover, at least a part of the steps in FIG. 1 to FIG. 5 may include a plurality of substeps or stages, and these substeps or stages are not necessarily completed at the same time, but may be executed at different times, and the order of execution of these sub-steps or stages is not necessarily sequential, but may be executed alternately or alternately with other steps or at least a part of substeps of other steps or stages.

Figure 6:
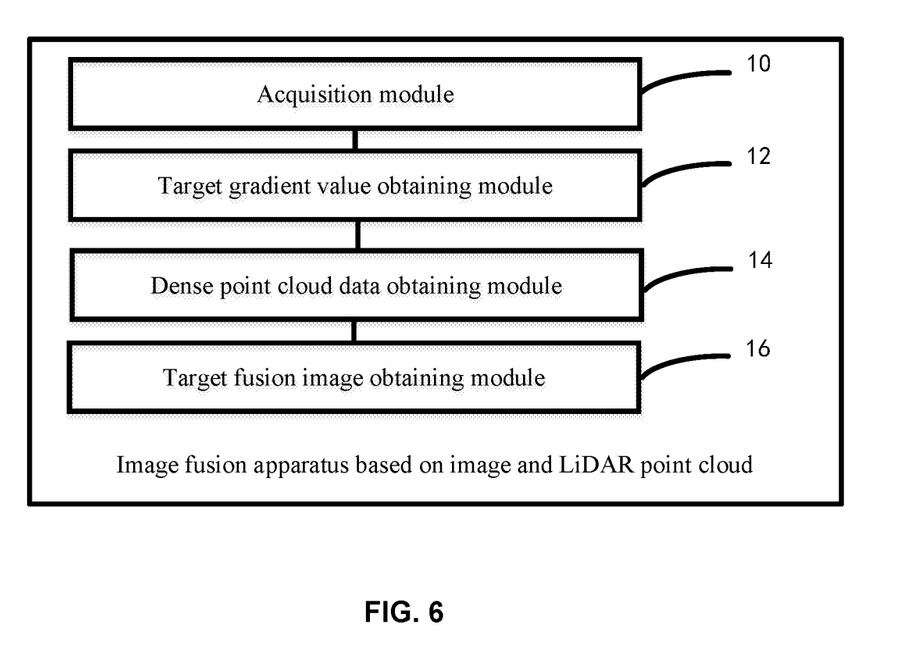
FIG. 6 is a structural schematic diagram of an image fusion apparatus based on image and LiDAR point cloud in accordance with the embodiments of the present disclosure.

In one embodiment, as shown in FIG. 6, an image fusion apparatus based on image and LiDAR point cloud is provided, including: an acquisition module 10, a target gradient value obtaining module 12, a dense point cloud data obtaining module 14 and a target fusion image obtaining module 16.

The acquisition module 10 is configured to acquire a first image and sparse point cloud data, point cloud data comprised in each channel of the sparse point cloud data corresponding to pixels comprised in the first image respectively, and the sparse point cloud data and the first image having space and time synchronicity.

The target gradient value obtaining module 12 is configured to obtain a target gradient value corresponding to at least one target pixel comprised in the first image according to the first image, the target pixel being a non-edge pixel of the first image.

The dense point cloud data obtaining module 14 is configured to up-sample the sparse point cloud data based on at least one target gradient value to obtain dense point cloud data, the target gradient value being determined according to a corresponding target pixel between adjacent channels of the sparse point cloud data.

The target fusion image obtaining module 16 is configured to obtain a target fusion image based on the first image and the dense point cloud data.

In one embodiment of the embodiments of the present disclosure, the target gradient value obtaining module 12 is specifically configured for performing gradient calculation on each pixel comprised in the first image to obtain a gradient value corresponding to each pixel; and determining the target gradient value corresponding to the target pixel according to the gradient value corresponding to each pixel.

In one embodiment of the embodiments of the present disclosure, the target gradient value obtaining module 12 is further specifically configured for judging whether the gradient value corresponding to each pixel is less than or equal to a preset gradient value; and when it is determined that the gradient value corresponding to the pixel is less than or equal to the preset gradient value, determining the target gradient value corresponding to the target pixel according to the current gradient value corresponding to the pixel.

In one embodiment of the embodiments of the present disclosure, the dense point cloud data obtaining module 14 is specifically configured for sequentially traversing to acquire first depth information corresponding to a previous channel and second depth information corresponding to a latter channel comprised in the sparse point cloud data until the latter channel is the last channel of the sparse point cloud data; obtaining third depth information corresponding to a target channel based on at least one target gradient value, the first depth information, and the second depth information, the target channel being determined according to a target pixel between the previous channel and the latter channel; and obtaining the dense point cloud data based on at least one first depth information, at least one second depth information and at least one third depth information.

In one embodiment of the embodiments of the present disclosure, the dense point cloud data obtaining module 14 is further specifically configured to acquire a target gradient value of at least one target pixel between the previous channel and the target channel and a target gradient value of at least one target pixel between the latter channel and the target channel; calculating an average value of the target gradient value of at least one target pixel between the previous channel and the target channel to obtain a first target gradient average value; calculating an average value of the target gradient value of at least one target pixel between the latter channel and the target channel to obtain a second target gradient average value; and determining the third depth information corresponding to the target channel according to the first target gradient average value, the second target gradient average value, the first depth information, and the second depth information.

In one embodiment of the embodiments of the present disclosure, the dense point cloud data obtaining module 14 is further specifically configured for weighting and summing the first target gradient average, the second target gradient average, the first depth information, and the second depth information to determine the third depth information corresponding to the target channel.

In one embodiment of the embodiments of the present disclosure, the dense point cloud data obtaining module 14 is further specifically configured for counting the number of target pixels between the previous channel and the latter channel; and determining the target pixel corresponding to the target channel based on the number of the target pixels.

In the above-mentioned embodiment, the acquisition module 10 is configured to acquire the first image and the sparse point cloud data, the point cloud data comprised in each channel of the sparse point cloud data corresponding to the pixels comprised in the first image respectively, and the sparse point cloud data and the first image having space and time synchronicity; the target gradient value obtaining module 12 is configured to obtain the target gradient value corresponding to at least one target pixel comprised in the first image according to the first image, the target pixel being the non-edge pixel of the first image; the dense point cloud data obtaining module 14 is configured to up-sample the sparse point cloud data based on at least one target gradient value to obtain the dense point cloud data, the target gradient value being determined according to the corresponding target pixel between the adjacent channels of the sparse point cloud data; and the target fusion image obtaining module 16 is configured to obtain the target fusion image based on the first image and the dense point cloud data. In this way, by acquiring the first image and the sparse point cloud data having time and space synchronicity, and utilizing the target gradient values of a plurality of non-edge pixels which are between the adjacent channels of the sparse point cloud data and corresponding to the first image, the sparse point cloud data are guided to be up-sampled, so as to obtain the dense point cloud data and map the dense point cloud data onto the first image to acquire the target fusion image, so that the condition that edge information is extracted by utilizing deep learning in the prior art is avoided, up-sampling of the sparse point cloud data is, a calculated amount is reduced, and a resolution of the point cloud data is improved.

Please refer to the definition of the image fusion method based on image and LiDAR point cloud above. For the specific definition of the image fusion apparatus based on image and LiDAR point cloud, which will not be discussed in further detail here. Each module in the above-mentioned server may be implemented in whole or in part by software, hardware and combinations thereof. The above modules may be embedded in or independent of a processor in a computer device in the form of hardware, or stored in a memory in the computer device in the form of software, so that the processor can call and execute operations corresponding to each module.

The embodiments of the present disclosure provide an electronic device, including: a memory, a processor and a computer program stored in the memory and executable on the processor, wherein the processor, when executing the computer program, can realize the image fusion method based on image and LiDAR point cloud in accordance with the embodiments of the present disclosure. For example, the processor, when executing the computer program, can realize the technical solutions of the method embodiments as shown in any one of FIG. 1 to FIG. 5, and the implementation principles and technical effects are similar, which will not be elaborated herein.

The present disclosure further provides a computer readable storage medium storing a computer program thereon, wherein the computer program, when being executed by a processor, can realize the image fusion method based on image and LiDAR point cloud in accordance with the embodiments of the present disclosure. For example, the computer program, when being executed by the processor, can realize the technical solutions of the method embodiments as shown in any one of FIG. 1 to FIG. 5, and the implementation principles and technical effects are similar, which will not be elaborated herein.

Those of ordinary skills in the art should understand that all or a part of the flow of the methods in the above embodiments may be implemented by instructing relevant hardware through a computer program. The computer program may be stored in a nonvolatile computer-readable storage medium which, when being executed, may include the flow of the above-mentioned method embodiments. Any reference to the memory, database or other media used in various embodiments provided by the present disclosure may each include at least one of nonvolatile and volatile memories. For example, the nonvolatile memory may include a Read-Only Memory (ROM), a magnetic tape, a floppy disc, a flash memory or an optical memory, and the like. The volatile memory may include a Random Access Memory (RAM) or an external cache memory. By way of illustration and not limitation, the RAM is available in various forms, such as Static Random Access Memory (SRAM) and Dynamic Random Access Memory (DRAM).

The technical features of the above embodiments can be combined in any way. In order to simplify the description, not all the possible combinations of the technical features of the above embodiments are described. However, as long as there is no contradiction between the combinations of these technical features, they should be considered as the scope recorded in this specification.

The above embodiments merely express several embodiments of the present disclosure, and the descriptions thereof are more specific and detailed, but cannot be understood as a limitation to the scope of patent. It should be noted that those of ordinary skills in the art may make a plurality of decorations and improvements without departing from the concept of the present disclosure, and these decorations and improvements shall all fall within the protection scope of the present disclosure. Therefore, the protection scope of the patent according to the present disclosure shall be subjected to the claims appended.

INDUSTRIAL APPLICABILITY

According to the image fusion method and apparatus based on image and LiDAR point cloud, the device and the medium in accordance with the embodiments of the present disclosure, the following manner is adopted: acquiring the first image and the sparse point cloud data, the point cloud data comprised in each channel of the sparse point cloud data corresponding to the pixels comprised in the first image respectively, and the sparse point cloud data and the first image having space and time synchronicity; obtaining the target gradient value corresponding to at least one target pixel comprised in the first image according to the first image, the target pixel being the non-edge pixel of the first image; up-sampling the sparse point cloud data based on at least one target gradient value to obtain the dense point cloud data, the target gradient value being determined according to the corresponding target pixel between the adjacent channels of the sparse point cloud data; and obtaining the target fusion image based on the first image and the dense point cloud data. In this way, by acquiring the first image and the sparse point cloud data having time and space synchronicity, and utilizing the target gradient values of a plurality of non-edge pixels which are between the adjacent channels of the sparse point cloud data and corresponding to the first image, the sparse point cloud data are guided to be up-sampled, so as to obtain the dense point cloud data and map the dense point cloud data onto the first image to acquire the target fusion image, so that the condition that edge information is extracted by utilizing deep learning in the prior art is avoided, up-sampling of the sparse point cloud data is, a calculated amount is reduced, and a resolution of the point cloud data is improved.

What is claimed is:

1. An image fusion method based on image and LiDAR point cloud, comprising:
    acquiring a first image and sparse point cloud data, wherein point cloud data in each channel of the sparse point cloud data corresponds to pixels in the first image respectively, and wherein the sparse point cloud data and the first image having space and time synchronicity;
    obtaining a target gradient value corresponding to at least one target pixel in the first image according to the first image, wherein the target pixel being a non-edge pixel of the first image;
    up-sampling the sparse point cloud data based on at least one target gradient value to obtain dense point cloud data, wherein the target gradient value is determined according to a corresponding target pixel between adjacent channels of the sparse point cloud data; and
    obtaining a target fusion image based on the first image and the dense point cloud data.

2. The method according to claim 1, wherein obtaining the target gradient value corresponding to the at least one target pixel in the first image according to the first image, comprises:
    performing gradient calculation on each pixel in the first image to obtain a gradient value corresponding to each pixel; and
    determining the target gradient value corresponding to the target pixel according to the gradient value corresponding to each pixel.

3. The method according to claim 2, wherein determining the target gradient value corresponding to the target pixel according to the gradient value corresponding to each pixel, comprises:
    determining whether the gradient value corresponding to each pixel is less than or equal to a preset gradient value; and when it is determined that the gradient value corresponding to the pixel is less than or equal to the preset gradient value, determining the target gradient value corresponding to the target pixel according to the gradient value corresponding to the pixel.

4. The method according to claim 1, wherein the up-sampling the sparse point cloud data based on at least one target gradient value to obtain the dense point cloud data, comprises:
sequentially traversing to acquire first depth information corresponding to a previous channel and second depth information corresponding to a latter channel comprised in the sparse point cloud data until the latter channel is the last channel of the sparse point cloud data;
obtaining third depth information corresponding to a target channel based on at least one target gradient value, the first depth information, and the second depth information, the target channel being determined according to a target pixel between the previous channel and the latter channel; and
obtaining the dense point cloud data based on at least one first depth information, at least one second depth information and at least one third depth information.

5. The method according to claim 4, wherein obtaining the third depth information corresponding to the target channel based on at least one target gradient value, the first depth information, and the second depth information, comprises:
acquiring a target gradient value of at least one target pixel between the previous channel and the target channel and a target gradient value of at least one target pixel between the latter channel and the target channel;
calculating an average value of the target gradient value of at least one target pixel between the previous channel and the target channel to obtain a first target gradient average value;
calculating an average value of the target gradient value of at least one target pixel between the latter channel and the target channel to obtain a second target gradient average value; and
determining the third depth information corresponding to the target channel according to the first target gradient average value, the second target gradient average value, the first depth information, and the second depth information.

6. The method according to claim 5, wherein the determining the third depth information corresponding to the target channel according to the first target gradient average value, the second target gradient average value, the first depth information, and the second depth information, comprises:
weighting and summing the first target gradient average, the second target gradient average, the first depth information, and the second depth information to determine the third depth information corresponding to the target channel.

7. The method according to claim 4, wherein the target channel is determined according to the target pixel between the previous channel and the latter channel, comprising:
counting a number of target pixels between the previous channel and the latter channel; and
determining the target pixel corresponding to the target channel based on the number of the target pixels.

8. An image fusion apparatus based on image and LiDAR point cloud, comprising:
an acquisition module configured to acquire a first image and sparse point cloud data, point cloud data comprised in each channel of the sparse point cloud data corresponding to pixels comprised in the first image respectively, and the sparse point cloud data and the first image having space and time synchronicity;
a target gradient value obtaining module configured to obtain a target gradient value corresponding to at least one target pixel comprised in the first image according to the first image, the target pixel being a non-edge pixel of the first image;
a dense point cloud data obtaining module configured to up-sample the sparse point cloud data based on at least one target gradient value to obtain dense point cloud data, the target gradient value being determined according to a corresponding target pixel between adjacent channels of the sparse point cloud data; and
a target fusion image obtaining module configured to obtain a target fusion image based on the first image and the dense point cloud data.

9. The image fusion apparatus according to claim 8, wherein the target gradient value obtaining module is further configured to:
perform gradient calculation on each pixel in the first image to obtain a gradient value corresponding to each pixel; and
determine the target gradient value corresponding to the target pixel according to the gradient value corresponding to each pixel.

10. The image fusion apparatus according to claim 9, wherein, to determine the target gradient value corresponding to the target pixel according to the gradient value corresponding to each pixel, the target gradient value obtaining module is further to:
determine whether the gradient value corresponding to each pixel is less than or equal to a preset gradient value; and
when it is determined that the gradient value corresponding to the pixel is less than or equal to the preset gradient value, determine the target gradient value corresponding to the target pixel according to the gradient value corresponding to the pixel.

11. The image fusion apparatus according to claim 8, wherein, to up-sample the sparse point cloud data based on at least one target gradient value to obtain the dense point cloud data, the dense point cloud data obtaining module is further to:
sequentially traverse to acquire first depth information corresponding to a previous channel and second depth information corresponding to a latter channel comprised in the sparse point cloud data until the latter channel is the last channel of the sparse point cloud data;
obtain third depth information corresponding to a target channel based on at least one target gradient value, the first depth information, and the second depth information, the target channel being determined according to a target pixel between the previous channel and the latter channel; and
obtain the dense point cloud data based on at least one first depth information, at least one second depth information and at least one third depth information.

12. The image fusion apparatus according to claim 11, wherein, to obtain the third depth information corresponding to the target channel based on at least one target gradient value, the first depth information, and the second depth information, the dense point cloud data obtaining module is further to:

acquire a target gradient value of at least one target pixel between the previous channel and the target channel and a target gradient value of at least one target pixel between the latter channel and the target channel;

calculate an average value of the target gradient value of at least one target pixel between the previous channel and the target channel to obtain a first target gradient average value;

calculate an average value of the target gradient value of at least one target pixel between the latter channel and the target channel to obtain a second target gradient average value; and determine the third depth information corresponding to the target channel according to the first target gradient average value, the second target gradient average value, the first depth information, and the second depth information.

13. An electronic device, comprising a memory and a processor, the memory storing a computer program, wherein the processor, when executing the computer program, is to:

acquire a first image and sparse point cloud data, wherein point cloud data in each channel of the sparse point cloud data corresponds to pixels in the first image respectively, and wherein the sparse point cloud data and the first image having space and time synchronicity;

obtain a target gradient value corresponding to at least one target pixel in the first image according to the first image, wherein the target pixel being a non-edge pixel of the first image;

up-sample the sparse point cloud data based on at least one target gradient value to obtain dense point cloud data, wherein the target gradient value is determined according to a corresponding target pixel between adjacent channels of the sparse point cloud data; and obtain a target fusion image based on the first image and the dense point cloud data.

14. The electronic device according to claim 13, wherein, to obtain the target gradient value corresponding to the at least one target pixel in the first image according to the first image, the processor is further to:

perform gradient calculation on each pixel in the first image to obtain a gradient value corresponding to each pixel; and determine the target gradient value corresponding to the target pixel according to the gradient value corresponding to each pixel.

15. The electronic device according to claim 14, wherein, to determine the target gradient value corresponding to the target pixel according to the gradient value corresponding to each pixel, the processor is further to:

determine whether the gradient value corresponding to each pixel is less than or equal to a preset gradient value; and when it is determined that the gradient value corresponding to the pixel is less than or equal to the preset gradient value, determine the target gradient value corresponding to the target pixel according to the gradient value corresponding to the pixel.

16. The electronic device according to claim 13, wherein, to up-sample the sparse point cloud data based on at least one target gradient value to obtain the dense point cloud data, the processor is further to:

sequentially traverse to acquire first depth information corresponding to a previous channel and second depth information corresponding to a latter channel comprised in the sparse point cloud data until the latter channel is the last channel of the sparse point cloud data;

obtain third depth information corresponding to a target channel based on at least one target gradient value, the first depth information, and the second depth information, the target channel being determined according to a target pixel between the previous channel and the latter channel; and obtain the dense point cloud data based on at least one first depth information, at least one second depth information and at least one third depth information.

17. The electronic device according to claim 16, wherein, to obtain the third depth information corresponding to the target channel based on at least one target gradient value, the first depth information, and the second depth information, the processor is further to:

acquire a target gradient value of at least one target pixel between the previous channel and the target channel and a target gradient value of at least one target pixel between the latter channel and the target channel;

calculate an average value of the target gradient value of at least one target pixel between the previous channel and the target channel to obtain a first target gradient average value;

calculate an average value of the target gradient value of at least one target pixel between the latter channel and the target channel to obtain a second target gradient average value; and determine the third depth information corresponding to the target channel according to the first target gradient average value, the second target gradient average value, the first depth information, and the second depth information.

18. The electronic device according to claim 17, wherein, to determine the third depth information corresponding to the target channel according to the first target gradient average value, the second target gradient average value, the first depth information, and the second depth information, the processor is further to:

weight and sum the first target gradient average, the second target gradient average, the first depth information, and the second depth information to determine the third depth information corresponding to the target channel.

19. The electronic device according to claim 16, wherein the target channel is determined according to the target pixel between the previous channel and the latter channel, and wherein the processor is further to:

count a number of target pixels between the previous channel and the latter channel; and determine the target pixel corresponding to the target channel based on the number of the target pixels.

* * * * *